(12) United States Patent
Kozlowski et al.

(10) Patent No.: US 12,556,066 B2
(45) Date of Patent: Feb. 17, 2026

(54) ROTATABLE ELECTRIC RECTIFIER FOR AN EXTERNALLY EXCITED SYNCHRONOUS MACHINE

(71) Applicant: MAHLE International GmbH, Stuttgart (DE)

(72) Inventors: Peter Kozlowski, Stuttgart (DE); Florian Osdoba, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 143 days.

(21) Appl. No.: 18/268,977

(22) PCT Filed: Dec. 22, 2021

(86) PCT No.: PCT/EP2021/087299
§ 371 (c)(1),
(2) Date: Jun. 21, 2023

(87) PCT Pub. No.: WO2022/136549
PCT Pub. Date: Jun. 30, 2022

(65) Prior Publication Data
US 2024/0388172 A1     Nov. 21, 2024

(30) Foreign Application Priority Data

Dec. 22, 2020  (DE) .................... 10 2020 216 485.1

(51) Int. Cl.
*H02K 11/042*     (2016.01)
(52) U.S. Cl.
CPC ................. *H02K 11/042* (2013.01)

(58) Field of Classification Search
CPC ................. H02K 11/042; H02K 2211/03
See application file for complete search history.

(56) References Cited

U.S. PATENT DOCUMENTS

| | | |
|---|---|---|
| 3,329,840 A | 7/1967 | Binder |
| 4,480,883 A | 11/1984 | Young |
| | (Continued) | |

FOREIGN PATENT DOCUMENTS

| | | |
|---|---|---|
| DE | 70647 A | 1/1970 |
| DE | 102016204444 A1 | 9/2016 |
| | (Continued) | |

OTHER PUBLICATIONS

English abstract for DE-102016216180.
(Continued)

*Primary Examiner* — Tulsidas C Patel
*Assistant Examiner* — Mohammed Ahmed Qureshi
(74) *Attorney, Agent, or Firm* — Fishman Stewart PLLC

(57) ABSTRACT

An electric rectifier for an electric externally excited synchronous machine. The rectifier may include a metal annular housing delimiting a housing interior and enclosing a passage opening configured to receive a rotor shaft of the electric synchronous machine. The housing may include a housing upper part and a housing lower part. The rectifier may also include a circuit board and an electrical rectifier circuit. The circuit board may be arranged in the housing interior on the housing lower part. The electrical rectifier circuit may be configured to rectify an electrical AC voltage. The electrical rectifier circuit may be arranged on the circuit board. The electrical rectifier circuit may include at least one electric rectifier element.

20 Claims, 2 Drawing Sheets

(56) References Cited

U.S. PATENT DOCUMENTS

| | | | |
|---|---|---|---|
| 4,768,844 | A | 9/1988 | Ludwig |
| 4,863,132 | A | 9/1989 | Fitzgerald |
| 5,056,877 | A | 10/1991 | Westwinkel |
| 5,671,985 | A | 9/1997 | Grieser |
| 6,896,342 | B1 | 5/2005 | Cheng |
| 2003/0076016 | A1 | 4/2003 | Westwinkel |
| 2006/0284499 | A1 | 12/2006 | Rubbo |
| 2008/0218035 | A1* | 9/2008 | Naghshineh ......... H02K 11/042 310/71 |
| 2015/0191099 | A1 | 7/2015 | Fink |
| 2018/0042379 | A1 | 2/2018 | Muskopf |
| 2019/0365098 | A1 | 12/2019 | Johannesson |

FOREIGN PATENT DOCUMENTS

| | | |
|---|---|---|
| DE | 102016216180 A1 | 3/2017 |
| GB | 1588567 A | 4/1981 |
| JP | S545534 A | 1/1979 |
| WO | 2018106167 A1 | 6/2018 |

OTHER PUBLICATIONS

English abstract for DE-102016204444.
German Search Report for DE-102020216485.1, mailed Dec. 3, 2021.
Japanese Office Action, JP2023-536417, dated Jul. 8, 2025 (w_translation).

* cited by examiner

ROTATABLE ELECTRIC RECTIFIER FOR AN EXTERNALLY EXCITED SYNCHRONOUS MACHINE

CROSS-REFERENCE TO RELATED APPLICATIONS

This application claims priority to International Patent Application No. PCT/EP2021/087299, filed on Dec. 22, 2021, and German Patent Application No. DE 10 2020 216 485.1, filed on Dec. 22, 2020, the contents of both of which are hereby incorporated by reference in their entirety.

TECHNICAL FIELD

The invention relates to a rotatable electric rectifier for an electric externally excited synchronous machine with an inductive energy transmission and to a synchronous machine having such a rectifier.

BACKGROUND

So-called externally excited synchronous machines require in their rotor an electrical DC voltage for generating the magnetic rotor field. This process is referred to as "rotor excitation". In conventional externally excited synchronous machines, the electrical rotor voltage is transmitted to the rotating rotor as electrical DC voltage with the help of so-called carbon brush slip ring contacts. It has proved to be disadvantageous in this that carbon brushes, especially at high rotational speeds, are abraded due to wear and in the process can create undesirable electrically conductive carbon dust.

Alternatively to such a transmission of the direct electric current with the help of slip rings it is known to realise the electrical voltage transmission to the rotating rotor inductively, i.e. wirelessly. As part of an externally excited synchronous machine, such a construction is also referred to as "rotary transformer" or inductive transmitter.

The function principle of the said inductive energy transmission is based on an electrical transformer, wherein the primary coil of the transformer is arranged on the stator of the rotary transformer or of the synchronous machine and the secondary coil on the rotating rotor. Since with the inductive energy transmission an electrical AC voltage is always generated in the secondary coil initially, it is necessary to electrically rectify the generated electrical AC voltage with the help of a suitable rectifier circuit, which can be likewise arranged on the rotor, i.e. convert the same into a rectified electrical voltage.

SUMMARY

It is an object of the present invention to show new ways in the development of rectifiers for externally excited synchronous machines. In particular, an improved embodiment for such a rectifier is to be created, which is characterised by a technically simple construction, yet allows a rotation of the rotor and thus of the rectifier with high rotational speed—this characteristic is also known to the relevant person skilled in the art by the designation "high speed stability".

This object is solved through the subject matter of the independent patent claim(s). Preferred embodiments are the subject matter of the dependent patent claim(s).

Accordingly, the basic idea of the invention is to arrange the electrical rectifier circuit of a rectifier for rectifying an electrical AC voltage into a rectified electrical voltage on an annular circuit board, which in turn is arranged in a likewise annular metallic housing made of a metal. The housing with the circuit board and the rectifier circuit can thus be easily mounted on a rotatable rotor shaft of an externally excited synchronous machine, which during the operation of the externally excited synchronous machine or relative to the stationary stator rotates about a given axis of rotation. In addition, an effective heat dissipation of the waste heat generated by the rectifier circuit during the operation can be achieved with the solution introduced here by means of the housing through an areal contact of the circuit board with the metallic housing. Finally, the housing can be used, even at high rotational speeds of the rotor, to mechanically stabilise the components of the rectifier circuit, in particular their rectifier elements arranged on the circuit board. Thus, the rectifier according to the invention, when used in an externally excited synchronous machine, possesses the desired high speed stability.

A rectifier according to the invention for a rotor of an electrical rotary transformer or for an externally excited synchronous machine, in particular for a traction motor of a vehicle, includes a housing of a metal, which delimits a housing interior. The housing has an annular geometry and encloses a passage opening for receiving a rotor shaft of an electric synchronous machine. The housing includes a housing upper part and a housing lower part. Further, the rectifier includes a circuit board arranged in the housing interior on the housing lower part. On the circuit board, an electrical rectifier circuit for rectifying an electrical AC voltage, preferentially into a rectified electrical voltage, is arranged. This rectifier circuit includes at least one electric rectifier element for rectifying the electrical AC voltage. The rectifier element can be a rectifier diode or a transistor, in particular a MOSFET.

According to a preferred embodiment, the housing made of metal surrounds the housing interior completely. In this way, the rectifier circuit is electrically shielded particularly well against the external environment of the rectifier, in particular when used in an externally excited synchronous machine, against electrical and magnetic interferences.

Practically, the at least one rectifier element can each be mounted on the circuit board by means of a soldered connection or by means of a pressure contact. This allows a simple mounting of the rectifier elements on the circuit board. According to a preferred embodiment, the at least one rectifier element with its diode housing lies against an inner circumferential wall of the housing lower part radially inside. When the rotor of a rotary transformer using the rectifier according to the invention or of an externally excited electric synchronous machine using the rectifier according to the invention—in particular with high rotational speed—the diode housings are mechanically stabilised by means of the inner circumferential wall.

According to an advantageous further development, the housing upper part comprises an axially extending opening collar enclosing the passage opening. In this further development, the at least one rectifier element with its diode housing lies against the housing collar radially outside. This measure also brings about a good thermal contact between the rectifier element and the housing upper part. This is true in particular during the operation of the rectifier, i.e. when the housing rotates and because of the centrifugal force, the rectifier elements are pushed radially to the outside against the opening collar. Thus, waste heat generated by the rectifier element during the operation, in addition to the housing lower part, can also be effectively dissipated via the housing upper part.

In a preferred embodiment, the circuit board lies flat against the housing lower part. In this way, waste heat, which is generated by the components of the rectifier circuit provided on the circuit board or/and by electrical/electronic elements arranged upstream or downstream of the rectifier circuit during the operation, can be dissipated via the housing to the outside to the external environment of the rectifier. In this way, an undesirable heating or even overheating of the circuit board and of the rectifier circuit arranged on the same, which could result in damage to the same, can be counteracted.

For the further improved thermal coupling of the at least one rectifier element to the housing of the rectifier, a preferentially electrically insulating thermal conduction means, in particular a so-called "gap pad" can be arranged according to an advantageous further development between the diode housing and the opening collar of the housing upper part.

Practically, the at least one rectifier element can be arranged in an intermediate space formed between the inner circumferential wall and the opening collar. This measure stabilises the rectifier element mechanically when the rectifier, as part of a rotor of an externally excited synchronous machine, is rotated with high rotational speed.

For the improved thermal coupling of the circuit board to the housing according to a further advantageous further development which can be combined with the advantageous further development explained above, an intermediate space present between the circuit board and the housing lower part, can be at least partly, preferably completely, filled with a preferably electrically conductive thermal conduction means, in particular a so-called "gap pad".

According to another advantageous further development, an intermediate space present between the circuit board and the housing upper part can, for mechanically fixing the circuit board in the housing interior, be filled at least partly, preferably completely with a filling means. Preferably, the filling means is or includes a casting compound, particularly preferably consisting of an electrically insulating material. This measure brings about an improved fixing of the circuit board in the housing interior, in particular when the housing during the operation in a synchronous machine rotates with high rotational speed.

In a preferred embodiment, the at least one rectifier element, preferentially the at least one rectifier diode, is mounted on the circuit board by means of at least one soldered connection. Here, classis soldered connections can be used while soldered connections in SMD design are also conceivable alternatively or additionally.

In another preferred embodiment, the at least one rectifier element is arranged completely on a radially inner end portion of the circuit board. The said radially inner end portion can, emanating from the radially inner end of the circuit board, extend across maximally 30%, preferably maximally 25%, particularly preferably maximally 20% of a radial extent of the circuit board. Preferably, this can apply to all preferentially all rectifier elements. In this way, the centrifugal forces acting on the respective rectifier element can be kept low.

According to an advantageous further development, at least one rectifier element has an axial extent that is greater than a radial extent of the same rectifier element. Preferably, this can apply to all preferentially all rectifier elements. In this way, the centrifugal forces acting on the respective rectifier element can also be kept low. Preferably, the axial extent amounts to at least twice, preferentially four times the radial extent.

Preferentially, the electric rectifier 100 can be designed for processing an electrical power output of at least 3 kW, preferably of at least 30 kW. Particularly preferably, the electric rectifier 100 is designed for processing an electrical power output between 30 kW and 500 kW, most preferably between 100 KW and 300 kW.

Thus, the rectifier can also be employed in a traction motor for the wireless transmission of an electric rotor current to a rotor of the traction motor.

Thus, the invention also relates to the use of the rectifier according to the invention introduced above in a traction motor of a vehicle.

Further, the invention relates to an externally excited electric synchronous machine having an electrically energizable synchronous machine stator for generating a magnetic stator field. Further, the synchronous machine includes a synchronous machine rotor that is rotatable relative to the synchronous machine stator and is electrically energizable for generating a magnetic rotor field. The synchronous machine rotor comprises a synchronous machine rotor shaft and an electric rectifier according to the invention introduced above, wherein the synchronous machine rotor shaft engages through the passage opening enclosed by the housing of the rectifier and the housing is firmly mounted, in particular positively, on the synchronous machine rotor shaft.

The synchronous machine according to the invention can be employed in particular in a motor vehicle, which as energy source can include a battery. The synchronous machine serves in particular for driving the motor vehicle, i.e. is formed in particular as a traction motor. Preferably, the traction motor according to the invention has an output or drive power output of at least 3 kW, preferably of at least 30 kW. Particularly preferably, the traction motor according to the invention has an output or drive power output between 30 kW and 500 kW, most preferably between 100 KW and 300 kW. With the traction motor according to the invention, waste heat which, with the traction motor according to the invention, is incurred to a far greater degree than with electric motors having lower output power, can be particularly effectively dissipated via the transformer core present in the rotary transformer stator.

BRIEF DESCRIPTION OF THE DRAWINGS

It shows, in each case schematically.

DETAILED DESCRIPTION

Figure 1:
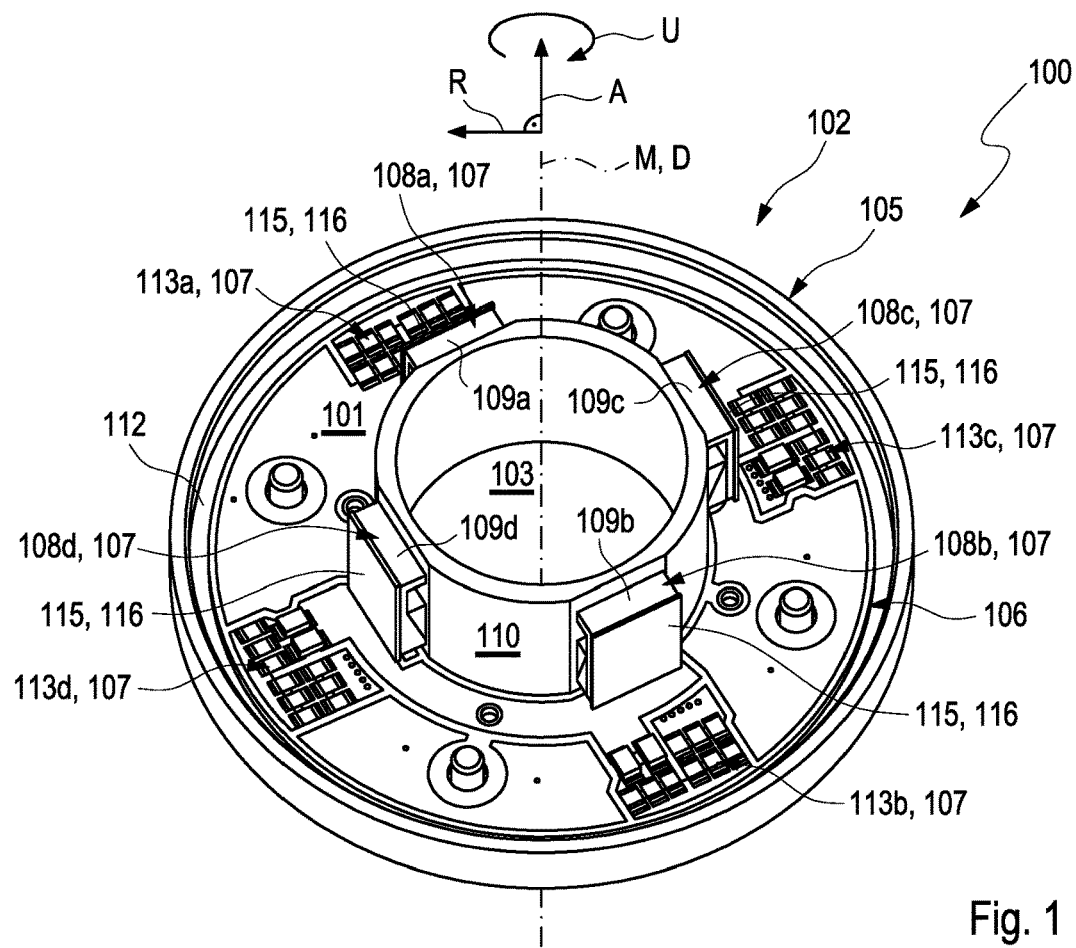
FIG. 1 shows an example of a rectifier according to the invention without housing upper part in a perspective representation.
Figure 2:
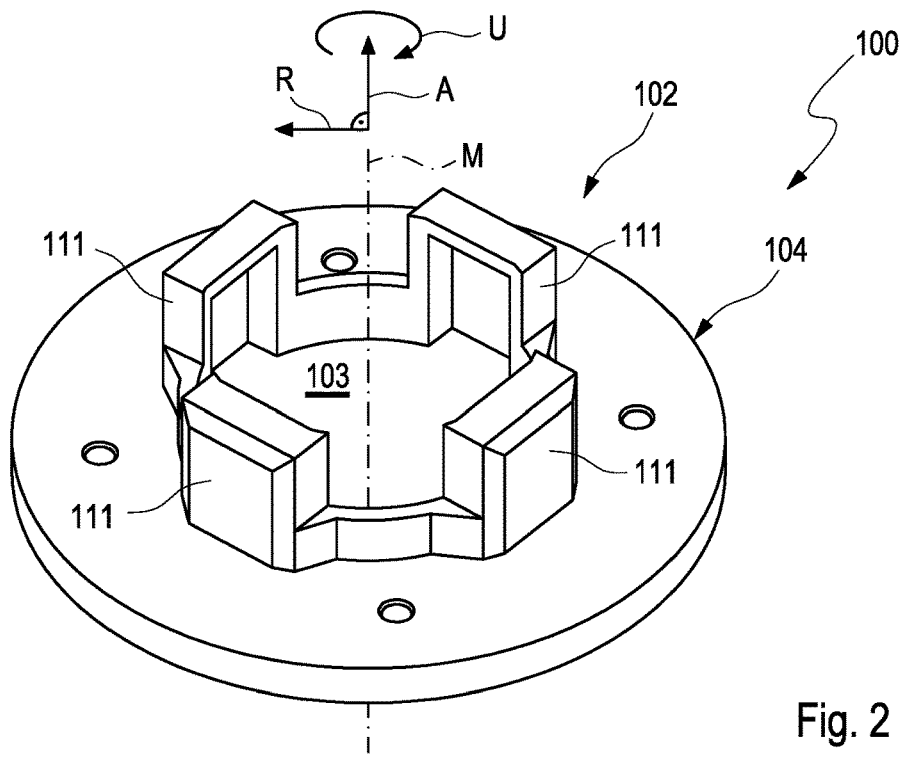
FIG. 2 shows the housing upper part of the housing of the rectifier not shown in FIG. 1, in a separate representation.

FIG. 1 shows an example of a rectifier 100 according to the invention without housing upper part 104, so that a housing interior 101 that is delimited by the housing upper part 104 and by the housing lower part 105—both housing parts 104, 105 form a housing 102 of the rectifier 100 made of metal in the assembled state is noticeable. FIG. 2 shows the housing upper part 104 not shown in FIG. 1 in a separate representation.

The FIGS. 1 and 2 illustrate that the housing 102 has an annular geometry and encloses a passage opening 103. An axial direction A extends along a centre longitudinal axis M of the annular housing 102. A radial direction R extends perpendicularly to the axial direction A away from the centre longitudinal axis M. A circumferential direction U extends perpendicularly to the axial direction A and also perpendicularly to the radial direction R circulating about the centre longitudinal axis M. The centre longitudinal axis M is identical to an axis of rotation D about which the housing 102 rotates when the rectifier 100 is installed in a synchronous machine rotor of an externally excited synchronous machine. In this case, a synchronous machine rotor shaft (not shown) that is rotatable about the axis of rotation D of the synchronous machine rotor engages through the passage opening 103, wherein the housing 102 is non-rotatably mounted on this synchronous machine rotor shaft (not shown).

The housing upper part 104 and the housing lower part 105 also have—analogously to the entire housing 102—such an annular geometry and each enclose the passage opening 103. In addition, the housing upper part 104 comprises an axially extending opening collar 111 enclosing the passage opening 103.

The housing lower part 105 of the housing 102 comprises a housing bottom 112 and an inner circumferential wall 110 axially projecting from the housing bottom 112, which encloses the passage opening 103. Practically, the inner circumferential wall 110 and the housing bottom 112 are formed integrally on one another. In a state of the housing 102 mounted on the rotor of the synchronous machine, the rotor shaft (not shown), which then engages through the passage opening 103, can thus lie areally against the inner circumferential wall 110. In the assembled state, the housing 102 surrounds the annular housing interior 101 completely.

FIG. 1 shows that in the housing interior 101 on the housing lower part 105 a circuit board 106 is arranged. On the circuit board 106 arranged on the housing lower part 105 in turn an electrical rectifier circuit 107 for rectifying an electrical AC voltage, preferentially into a rectified electrical voltage, is arranged. The circuit board 106 lies areally against the housing lower part 105. In this way, waste heat, which is generated by the components of the rectifier circuit 107, in particular the said rectifier elements 108a-108d provided on the circuit board 106 during the operation, is dissipated via the housing 102 to the outside to the external environment of the rectifier 100 and also to a synchronous machine rotor shaft of the synchronous machine engaging through the passage opening 103.

According to FIG. 1, the electrical rectifier circuit 107 includes four electric rectifier elements 108a-108d, which in the example are each formed as rectifier diode with a respective diode housing 109a-109d. Alternatively to rectifier diodes, transistors, in particular MOSFETs, can also be used. The rectifier elements 108a-108d or the rectifier diodes can be mounted on the circuit board 106 by means of respective soldered connections. Here, typical soldered connections can be used while alternatively or additionally soldered connections in SMD design are also conceivable. When using suitable diode housings 109a-109d, the rectifier elements 108a-108d can be mounted on the circuit board 106 by means of through-whole installation and in each case fixed to the circuit board 106 by means of a soldered connection. The rectifier circuit 107 can comprise further electronic elements which are arranged on the circuit board 106. These components can be in particular SMD components, which can thus pass waste heat developed during the operation on to the circuit board 106 and via the same on to the housing 102. In particular, electrical/electronic elements 108a-108d, which can be embodied in particular as SMD components, arranged downstream of the rectifier circuit 107 with the four rectifier elements 108a-108d can be arranged on the circuit board 106.

The electric rectifier 100 can be designed for processing an electrical power output of at least 3 kW, preferably of at least 30 kW. Particularly preferably, the electric rectifier 100 is designed for processing an electrical power output between 30 kW and 500 kW, most preferably between preferably 100 KW and 300 kW.

Figure 3:
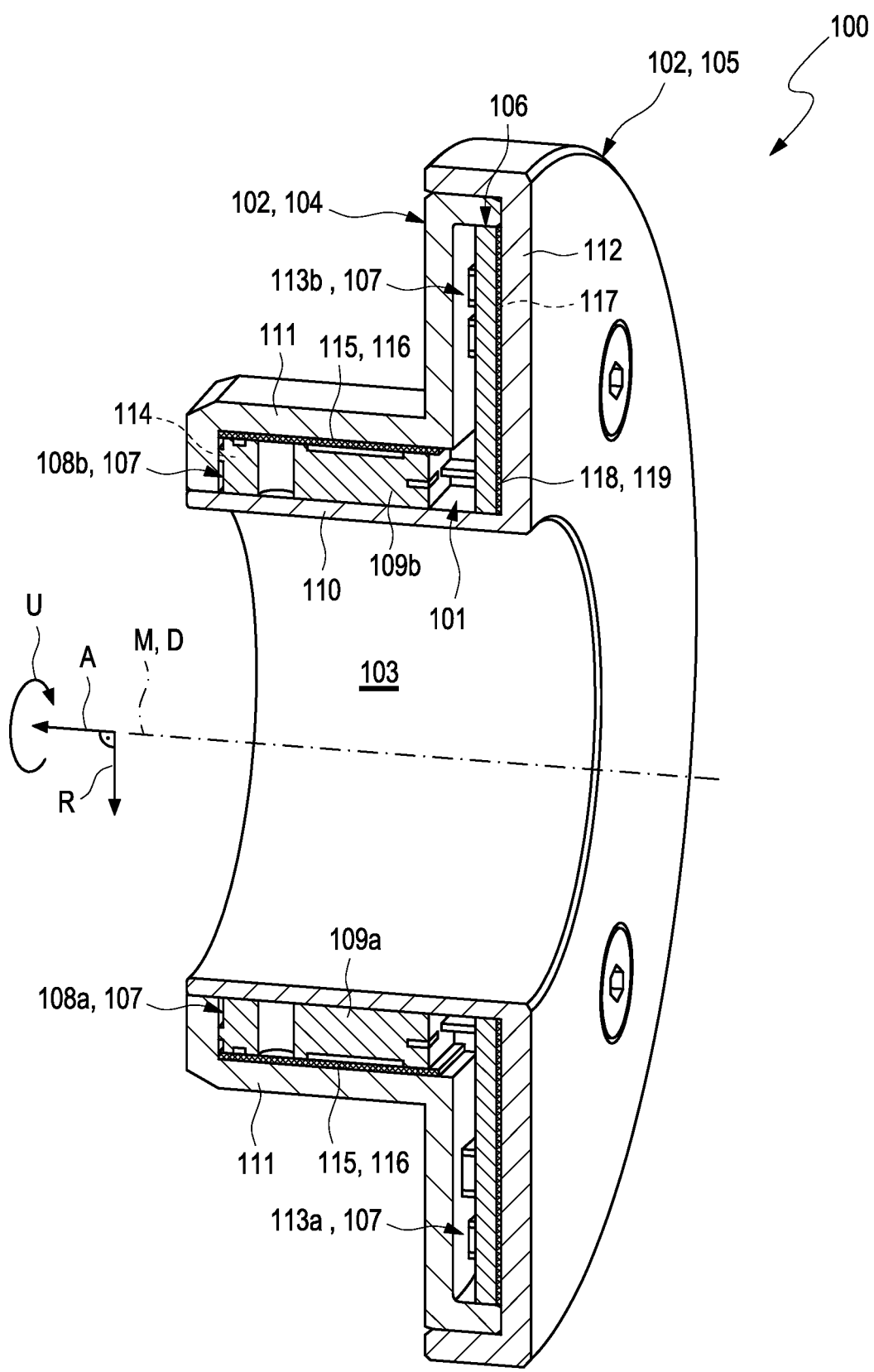
FIG. 3 shows the rectifier of FIGS. 1 and 2 in an assembled state.

FIG. 3 shows the rectifier 100 in a sectional representation in an assembled state. The rectifier elements 108a-108d can be completely arranged on a radially inner end portion of the circuit board 106. The radially inner end portion, emanating from the radially inner end of the circuit board 106, can extend across maximally 30%, preferably maximally 25%, particularly preferably maximally 20% of a total radial extent of the circuit board. In this way, the centrifugal forces acting on the respective rectifier elements 108a-108d can be kept low.

The four rectifier elements 108a-108d are additionally arranged in an intermediate space 114 formed between the inner circumferential wall 110 and the opening collar 111. Each of the four rectifier elements 108a-108d comprises a diode housing 109a-109d. The four rectifier elements 108a-108d lie, with their respective diode housing 109a-109d, radially inside against an inner circumferential wall 110 of the housing lower part 105 enclosing the passage opening 103. In addition, the four rectifier elements 108a-108d lie with their respective diode housing 109a-109d against the opening collar 111 radially outside.

In the example, the rectifier elements 108a-108d each have an axial extent measured along the axial direction which is greater than its respective radial extent measured along the radial direction R. The centrifugal forces acting on the respective rectifier element 108a-108d can also be kept low in this way.

For the improved thermal coupling of the rectifier elements 108a-108d to the housing 102 of the rectifier 100, a thermal conduction means 115, for example the said "gap pad" 116, of a material with a high thermal conductivity, can be arranged between the respective diode housing 109a-109d and the opening collar 111. Likewise, for thermally coupling the circuit board 106 to the housing 102, an intermediate space 117 present between the circuit board 106 and the housing lower part 105 can be filled at least partly, preferably completely, with a thermal conduction means 118, in particular with the already mentioned gap pad 119, preferably of an electrically insulating material. For mechanically fixing the circuit board 106 in the housing interior 101, an intermediate space present between the circuit board 106 and the housing upper part 104 can be at least partly, preferably completely filled with a filling means, preferentially a casting compound, particularly preferably of an electrically insulating material.

The invention claimed is:

1. An electric rectifier for an electric externally excited synchronous machine, comprising:
   a metal annular housing delimiting a housing interior and enclosing a passage opening configured to receive a rotor shaft of the electric synchronous machine, the housing including a housing upper part and a housing lower part connectable to one another to form the housing, the housing interior delimited by and between the housing upper part and the housing lower part;
   a circuit board arranged in the housing interior on the housing lower part;

an electrical rectifier circuit configured to rectify an electrical AC voltage, the electrical rectifier circuit arranged on the circuit board; and wherein the electrical rectifier circuit includes at least one electric rectifier element.

2. The rectifier according to claim 1, wherein the housing interior is completely surrounded by and enclosed within the housing.

3. The rectifier according to claim 1, wherein the at least one rectifier element includes a diode housing that lies against an inner circumferential wall of the housing lower part in a radially inward direction.

4. The rectifier according to claim 1, wherein:
the housing upper part includes an axially extending opening collar enclosing the passage opening; and
the at least one rectifier element includes a diode housing that lies against the opening collar in a radially outward direction.

5. The rectifier according to claim 4, wherein:
the housing lower part includes an inner circumferential wall; and
the at least one rectifier element is arranged in an intermediate space formed between the inner circumferential wall and the opening collar.

6. The rectifier according to claim 4, further comprising a thermal conductor arranged between the diode housing and the opening collar.

7. The rectifier according to claim 1, further comprising:
a thermal conductor disposed within and at least partially filling an intermediate space defined between the circuit board and the housing lower part; and/or
a filler material disposed within and at least partially filling an intermediate space defined between the circuit board and the housing upper part.

8. The rectifier according to claim 1, wherein the at least one rectifier element is completely arranged on a radially inner end portion of the circuit board.

9. The rectifier according to claim 1, wherein:
the at least one rectifier element has an axial extent and a radial extent; and
the axial extent is greater than the radial extent.

10. An externally excited electric synchronous machine, comprising:
an electric rectifier according to claim 1;
an electrically energizable synchronous machine stator configured to provide a magnetic stator field; and
an electrically excitable synchronous machine rotor configured to provide a magnetic rotor field, the synchronous machine rotor rotatable relative to the synchronous machine stator, the synchronous machine rotor including a synchronous machine rotor shaft engaging through the passage opening enclosed by the housing of the electric rectifier.

11. The synchronous machine according to claim 10, wherein the synchronous machine has at least one of an output and a drive power output of at least 3 kW.

12. An electric rectifier for an electric externally excited synchronous machine, comprising:
a metal annular housing delimiting a housing interior and enclosing a passage opening configured to receive a rotor shaft, the housing including a housing upper part and a housing lower part;
the housing lower part including an inner circumferential wall;
the housing upper part including an axially extending opening collar enclosing the passage opening;
a circuit board arranged on the housing lower part within the housing interior;
an electrical rectifier circuit configured to rectify an electrical AC voltage into a rectified electrical voltage, the electrical rectifier circuit arranged on the circuit board; and
wherein the electrical rectifier circuit includes a plurality of electric rectifier diodes that are disposed radially between and contact (i) the inner circumferential wall of the housing lower part and (ii) the opening collar of the housing upper part.

13. An electric rectifier for an electric externally excited synchronous machine, comprising:
a metal annular housing delimiting a housing interior and enclosing a passage opening configured to receive a rotor shaft, the housing including a housing upper part and a housing lower part;
a circuit board arranged on the housing lower part within the housing interior;
an electrical rectifier circuit configured to rectify an electrical AC voltage into a rectified electrical voltage, the electrical rectifier circuit arranged on the circuit board; and
wherein the electrical rectifier circuit includes a plurality of electric rectifier diodes that lie against an inner circumferential wall of the housing lower part in a radially inward direction.

14. The rectifier according to claim 1, wherein:
the housing lower part includes a first end wall and an inner circumferential wall projecting axially from the first end wall; and
the housing upper part includes a second end wall and an opening collar projecting axially from the second end wall.

15. The rectifier according to claim 14, wherein the opening collar includes a castellated end disposed opposite the second end wall.

16. The rectifier according to claim 14, wherein the at least one rectifier element is arranged in at least one depression disposed in an inner circumferential surface of the opening collar.

17. The rectifier according to claim 14, wherein:
a first region of the housing interior is defined axially between the first end wall of the housing lower part and the second end wall of the housing upper part; and
a second region of the housing interior is defined radially between the inner circumferential wall of the housing lower part and the opening collar of the housing upper part.

18. The rectifier according to claim 17, wherein a radial extent of the first region of the housing interior is greater than a radial extent of the second region of the housing interior.

19. The rectifier according to claim 1, wherein, in at least one region, the housing interior has an L-shaped radial cross-section.

20. The rectifier according to claim 8, wherein the radially inner end portion of the circuit board emanates from a radially inner end of the circuit board and extends across 30% or less of a radial extent of the circuit board.

* * * * *